US012657424B2

(12) United States Patent
Donnelly et al.

(10) Patent No.: US 12,657,424 B2
(45) Date of Patent: Jun. 16, 2026

(54) CARD EQUIPPED WITH A CONTACTLESS INTERFACE AND METHOD FOR MANUFACTURING THE CARD EQUIPPED WITH A CONTACTLESS INTERFACE

(71) Applicant: IDEMIA FRANCE, Courbevoie (FR)

(72) Inventors: Scott Donnelly, Courbevoie (FR); Thomas Visseiche, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 18/987,650

(22) Filed: Dec. 19, 2024

(65) Prior Publication Data

US 2025/0209295 A1     Jun. 26, 2025

(30) Foreign Application Priority Data

Dec. 26, 2023     (FR) ................................... FR2315305

(51) Int. Cl.
*G06K 19/077*          (2006.01)

(52) U.S. Cl.
CPC .............................. *G06K 19/07773* (2013.01)

(58) Field of Classification Search
CPC ................................................ G06K 19/07773
USPC ......................................................... 235/492
See application file for complete search history.

(56) References Cited

U.S. PATENT DOCUMENTS

| | | | |
|---|---|---|---|
| 2002/0190132 A1 * | 12/2002 | Kayanakis | ......... G06K 19/0775 235/492 |
| 2003/0052177 A1 * | 3/2003 | Halope | ............ G06K 19/07743 235/492 |

| | | | |
|---|---|---|---|
| 2006/0289657 A1 | 12/2006 | Rosenberg | |
| 2008/0314988 A1 * | 12/2008 | Geuens | ................. B32B 37/223 235/488 |
| 2009/0230197 A1 | 9/2009 | Tanner | |
| 2012/0201994 A1 * | 8/2012 | Michalk | ........... G06K 19/07718 428/68 |

(Continued)

FOREIGN PATENT DOCUMENTS

EP          1 544 787 A1     6/2005

OTHER PUBLICATIONS

French Preliminary Search Report and Written Opinion dated Aug. 8, 2024 in FR2315305 filed on Dec. 26, 2023 citing documents 1-3 and 15 therein, 14 pages.

*Primary Examiner* — Allyson N Trail
(74) *Attorney, Agent, or Firm* — Oblon, McClelland, Maier & Neustadt, L.L.P.

(57)          ABSTRACT

The present invention relates to a card equipped with a contactless interface. The card has an activation device, a microprocessor and an antenna. The activation device has a first and a second conductive component, and a spacer. The microprocessor and the antenna are each connected to the first conductive component or to the second conductive component. A cavity of the card has a normal state and a deformed state, and at least part of the cavity is configured to separate the first component from the second component in the normal state. When a force external to the activation device is applied to the activation device to move the first component towards the second component, the cavity transitions from the normal state to the deformed state, and a part of the first conductive component is configured to enter the cavity, thus forming an electrical contact with the second conductive component.

19 Claims, 5 Drawing Sheets

(56)  References Cited

U.S. PATENT DOCUMENTS

| | | | | |
|---|---|---|---|---|
| 2014/0097253 A1* | 4/2014 | Benato | ............ | G06K 19/07749 |
| | | | | 235/488 |
| 2017/0249545 A1* | 8/2017 | Eymard | ........... | G06K 19/07769 |
| 2020/0034679 A1* | 1/2020 | Proye | ................ | H01L 23/49822 |
| 2023/0244899 A1* | 8/2023 | Kwak | ............. | G06K 19/07749 |
| | | | | 340/572.7 |

* cited by examiner

[Fig. 1]
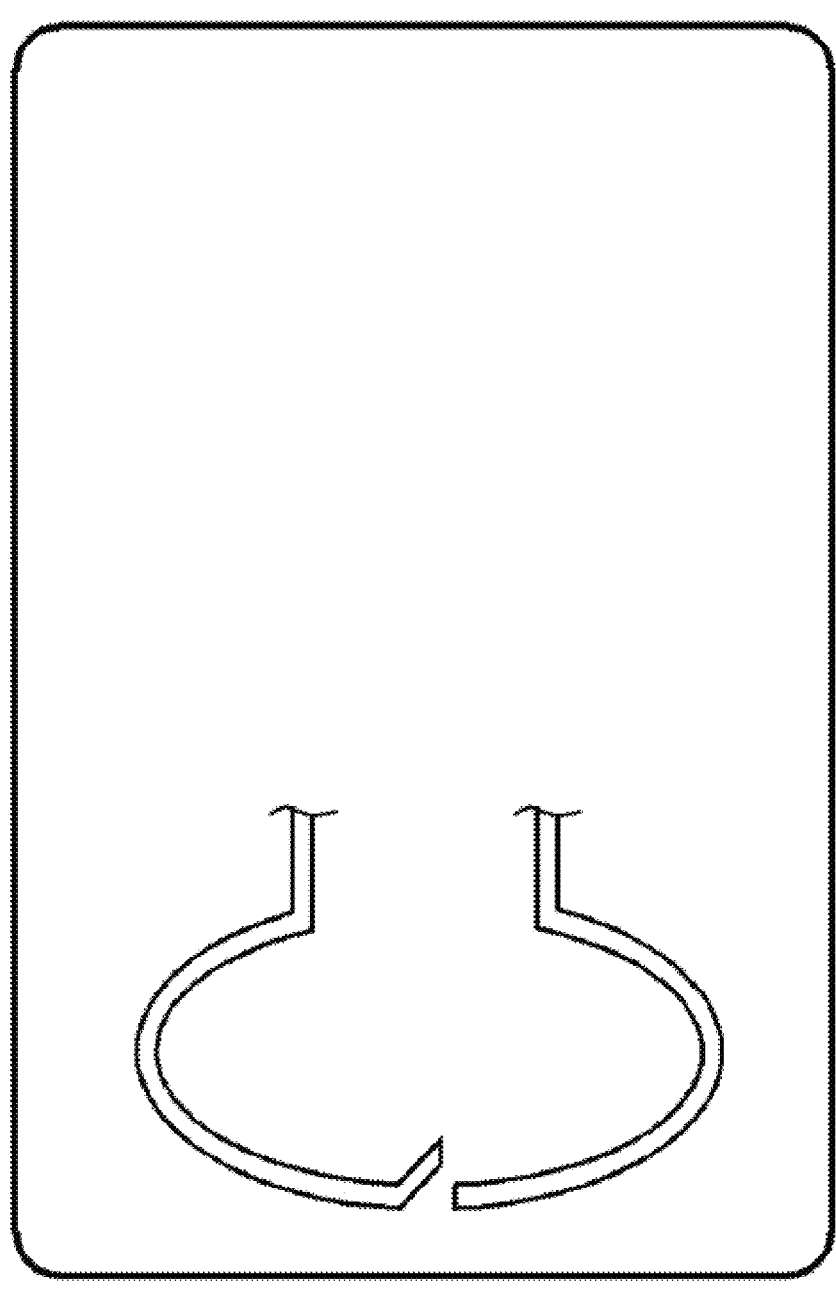

[Fig. 2]
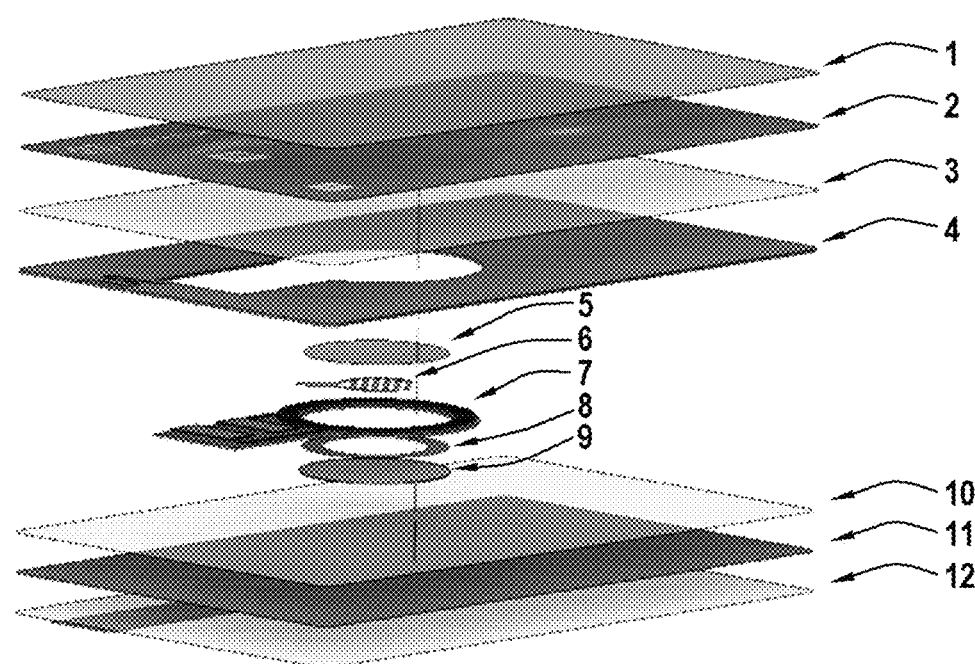

[Fig. 3]
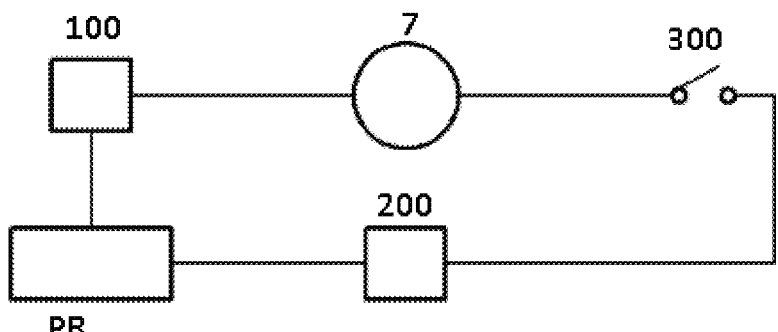
[Fig. 4]
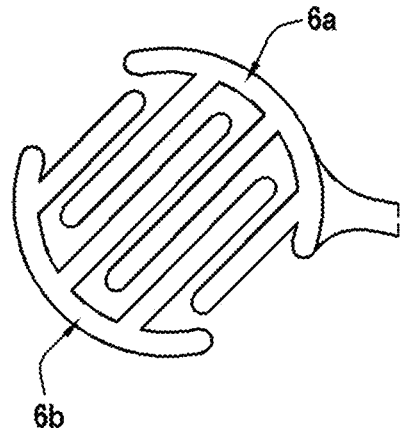

[Fig. 5a]
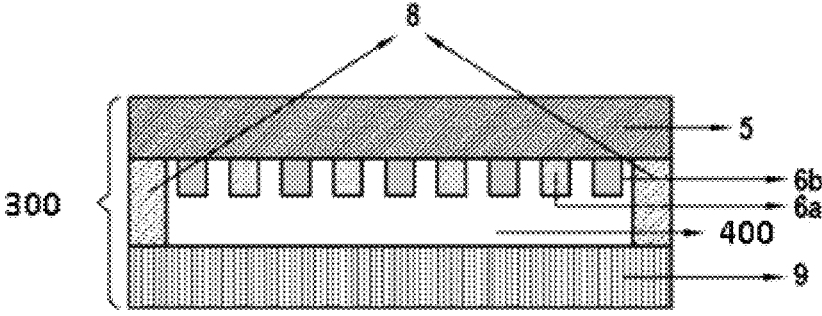
[Fig. 5b]
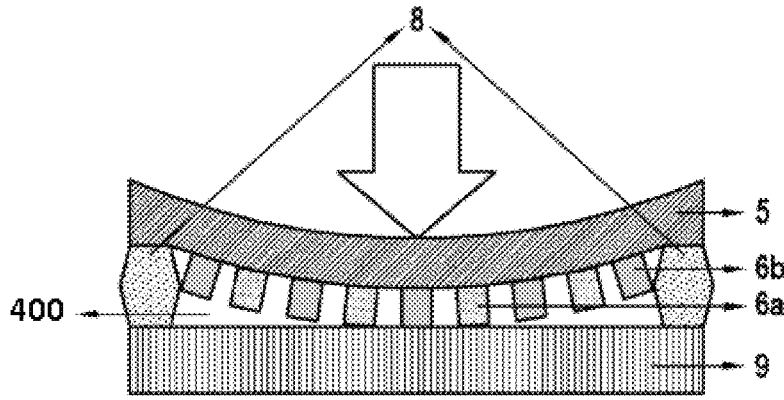
[Fig. 5c]
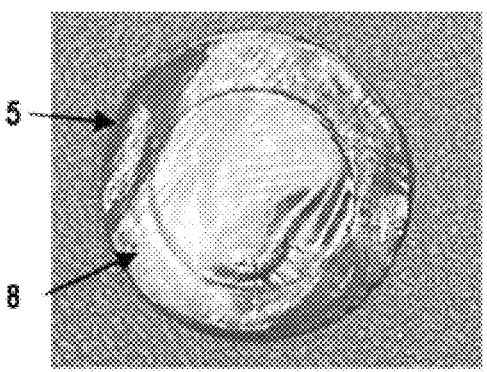

[Fig. 6]
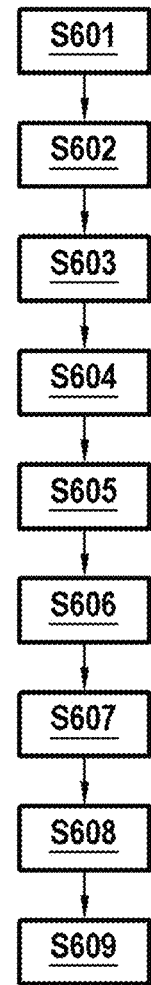

CARD EQUIPPED WITH A CONTACTLESS INTERFACE AND METHOD FOR MANUFACTURING THE CARD EQUIPPED WITH A CONTACTLESS INTERFACE

TECHNICAL FIELD

The present invention relates generally to the field of cards having a contactless functionality and, more particularly, to a card equipped with a contactless interface and to a method for manufacturing the card.

PRIOR ART

Chip cards serve as data storage devices which have various applications, notably for access control, payments and identification. Each chip card incorporates an integrated circuit (hereinafter "IC") which allows the card to store and process data. This IC has a microcontroller or a similar processor and a memory.

There are various types of chip cards, notably cards equipped with solely a contactless interface, cards equipped with solely a contact interface, and dual-interface cards having both contact and contactless capabilities.

A widespread concern regarding contactless communications is the risk that unauthorized persons use equipment of the scanner type to unlawfully retrieve personal information from the card about its holder.

There are various patents and products that aim to address this problem. By way of example, the United States patent application published under no. US2009/0039149A1 describes a contactless card which has a switch. Once activated, this switch creates an open circuit within the antenna of the card so as to deactivate the contactless function of the card. FIG. 1 illustrates this antenna.

However, this approach has some drawbacks. It requires the use of a normally closed switch which is robust and always able, once it is closed, to effectively create a short circuit within the antenna, and can require a local energy source to open and close the switch. This can lead to a complex and bulky design.

SUMMARY

The present invention seeks to overcome the aforementioned drawback of the existing technology. Unless indicated otherwise, the term "or" is understood to mean "and/or" in the present document.

According to a first aspect, the present invention relates to a card equipped with a contactless interface. The card has a microprocessor, an antenna and an activation device.

The card may be either a contactless card, or a dual-interface card. Card examples that can be cited are payment cards (such as credit and debit cards), travel passes (used in public transport systems), access passes (such as library cards and the electronic toll cards used in motorway and bridge toll systems), EMV (which stands for "Europay, Mastercard and Visa") cards, among others.

The contactless interface of the card may be integrated with one or more telecommunication technologies, notably but not exclusively radiofrequency identification (hereinafter "RFID"), the technology referred to as Wireless Fidelity (hereinafter "Wi-Fi"), Bluetooth low energy technology (hereinafter "BLE"), Zigbee, and Z-Wave.

The expression "RFID compatible card" is understood in the present document to mean any card which communicates by means of a radiofrequency technology. It may be an RFID card or a near-field communication (hereinafter "NFC") card.

The contactless interface can be adapted to any version of the telecommunication protocols associated with the aforementioned technologies. By way of example, in the case of an NFC card, it may be compatible with any version of the ISO/IEC 14443, 15693 or 18092 standard. In the case of a Wi-Fi compatible card, it may function with any version of the IEEE 802.11 standard.

By way of example, the expression "activation device" is understood to be a device configured to act as a switch between the microprocessor and the antenna. More specifically, this device is configured to activate the contactless function of the card when an external force, as described later on, is applied to it, and deactivate the contactless function when the external force is removed. It has a spacer, a first conductive component and a second conductive component.

The expression "conductive component" is understood in the present document to mean an electronic component made of one or more conductive materials and capable of conducting electricity in a closed circuit. A conductive component may have a (several) contact pad(s) and/or a (several) conductive track(s) and/or a (several) connecting wire(s) and/or an (several) electrode(s).

In addition, the expression "connected to" or the term "connection" is understood in the present document to be a connection which is wired, wireless, direct, indirect (for example via one or more intermediary connections), or the like that allows an electrical current to flow between two electric components.

The spacer is in contact with the perimeter of the second conductive component. The spacer is configured to form lateral walls of a deformable cavity within the activation device. The second conductive component is configured to form at least part of either the top or the bottom surface of the cavity.

The "perimeter" of a conductive component is in this case defined by a contour of the conductive component.

The expression "lateral walls of the cavity" is understood in the present document to mean the side walls of the cavity, of which the vertical dimension(s) defines (define) the height(s) of the cavity in the thickness direction of the card (i.e. the direction from top to bottom of the card). The second conductive component may be substantially parallel to the top or the bottom surface of the card.

The cavity has a normal state and a deformed state. At least part of the cavity is configured to separate the first conductive component from the second conductive component when the cavity occupies the normal state. The two components may face one another.

When a force external to the activation device is applied to the activation device (typically when a user's finger exerts a pressure on the card) to move the first conductive component towards the second conductive component, the cavity is configured to transition from the normal state to the deformed state, and at least one part of the first conductive component is configured to enter the cavity. When the cavity occupies the deformed state, the first and second conductive components come into electrical contact with one another to establish an electrical connection between the microprocessor and the antenna.

Moreover, when the external force stops being applied (typically when the user's finger stops exerting a pressure on the card), the cavity is configured to return to its normal state, thereby moving the first conductive component away from the second conductive component to break the electrical connection. By way of example, the spacer is elastic, thereby acting in the manner of a spring.

More particularly, the microprocessor and the antenna are each connected to the first conductive component or to the second conductive component. By way of example, the microprocessor is connected to one of the two conductive components, and the antenna is connected to the other. In a variant, the first conductive component has two conductive sub-components which are electrically insulated when the cavity occupies its normal state, one sub-component being connected to the microprocessor and the other to the antenna. When the cavity occupies the deformed state and the first and second conductive components are in contact, the second conductive component is configured to form an electrical bridge between the two sub-components.

The expression "when an external force stops being applied" is understood to mean the precise moment when the force stops being applied, or any instant or duration following the moment when the force is no longer applied to the activation device of the card.

By way of example, before the force is applied to the activation device, the cavity occupies its normal state and has a first form. When the external force is applied, the cavity undergoes deformation, and finishes by assuming a second form. Following the removal of the external force, the cavity finishes by returning to a form identical to the first form or slightly different therefrom.

In this respect, the activation device could be normally open to ensure that the microprocessor stays non-operational as long as a user is not applying a force to the card.

The fact that the spacer configured to form lateral walls of the cavity is in contact with the perimeter of the second conductive component makes the activation device compact.

In comparison with previous designs, the configuration described above affords a simplified structure, is easy to manufacture, reduces the manufacturing costs, is less bulky, and provides greater stability and reliability.

Providing a card with a spacer in contact with a perimeter of the second conductive component makes it possible for example to increase the surface area of the second conductive component that is in contact with the first conductive component on deformation of the cavity.

This furthermore enables better deformation of the cavity.

In a practical application of the invention, a user exerts a pressure on the activation device, thereby bringing the first and second conductive components into contact with one another. This establishes an electrical connection between the microprocessor and the antenna, thereby making it possible to transfer energy from the antenna to the microprocessor and activating the contactless function of the card. When the user releases the activation device (for example by removing their finger), the first conductive component is moved away from the second conductive component, thereby breaking the connection and deactivating the contactless function.

In a particular example which is compatible with any other example in the present document, the activation device moreover has a non-conductive layer which is configured to bear the first conductive component. This could ensure better protection of the first conductive component against damage.

In addition, the non-conductive layer and the second conductive component may be respectively arranged on opposite surfaces of the cavity, thereby incorporating the first conductive component in the cavity. The distance between the first and the second conductive component improves the reliability of the activation device.

The spacer does not necessarily have to extend over the entire surface area of the cavity. It can cover the outer surfaces of the second conductive component, more specifically the surfaces that are not in contact with the first conductive component when the cavity occupies its deformed state, so as to protect the second conductive component against environmental factors and make the cavity more leaktight. With preference, the spacer may be provided with an annular shape. It may be sandwiched between the second conductive component and the non-conductive layer, or the main part of the spacer connects the second conductive component and the non-conductive layer while its ends extend to cover the outer edges of the second conductive component and of the non-conductive layer.

In another particular example which is compatible with any other example in the present document, the card comprises an adhesive. This adhesive is able to impede the establishment of the electrical contact between the first and second conductive components if it adheres to the first conductive component or to the inner surface of the second conductive component (i.e. to the surface that is in contact with the first conductive component when the cavity occupies its deformed state). To overcome this problem, the cavity is made leaktight, the first conductive component is encapsulated within the cavity, and the spacer or the non-conductive layer is made of one or more materials that are impervious to the adhesive in its liquid form or its solid form.

This configuration of the activation device could prevent the corrosion or the deterioration of the first and second conductive components by contaminants, chemical products, salts, moisture, adhesives, etc.

By way of example, the card contains an adhesive, a resin or a plastics film in contact with the activation device. The adhesive, the resin or the plastics film may comprise or be made of at least one of the following elements: alkyd, acrylic, epoxy, polyester, phenol, polycarbonate, polyamide, polyimide, polyurethane, silicone, polyethylene, polystyrene, polypropylene, vinyl ester, methacrylate, cyanoacrylate, or polyvinyl acetate.

Consequently, the spacer or the non-conductive layer is made of a (several) material(s) impervious to the adhesive, to the resin or to the plastics film in their liquid form or solid form in order to prevent the adhesive, the resin or the plastic entering the cavity. The cavity can be made leaktight by the non-conductive layer, the spacer and the second conductive component.

In yet another particular example which is compatible with any other example in the present document, each of one or more elements of the activation device is deformable and has a normal state and a deformed state. The element(s) comprises (comprise) the spacer or the non-conductive layer. The cavity is configured to occupy its normal state when the element(s) occupies (occupy) its (their) normal state, and is configured to occupy its deformed state when the element(s) occupies (occupy) its (their) deformed state.

In yet another particular example which is compatible with any other example in the present document, the spacer is deformable and is configured to be compressed (for example to have a reduced thickness measured in the direction of action of the external force) when it transitions from its normal state to its deformed state. This could allow users to more easily manage the activation and deactivation of the contactless or wireless communication function of the card, while at the same time also simplifying the structure of the card.

In yet another particular example which is compatible with any other example in the present document, the non-conductive layer is deformable and is configured to deform in the direction of action of the external force when the force is applied to the activation device. The non-conductive layer may be substantially parallel to the top or the bottom surface of the card in its normal state. This configuration ensures that the card remains flat in the absence of external forces, thereby making it more convenient to carry around and making it better protected against damage.

In yet another particular example which is compatible with any other example in the present document, at least one part of the one or more deformable elements of the activation device is elastic. The at least one part of the (several) deformable element(s) is configured to deform when the external force is applied to the activation device, and to contribute to moving the first conductive component away from the second conductive component when the external force stops.

By way of example, when the external force is applied to the activation device, it causes the at least one part of the (several) deformable element(s) of the activation device to deform, thereby bringing the first and second conductive components into contact with one another and creating an electrical bridge. When the application of the force has stopped, the deformable element(s) returns (return) to its (their) initial shape, at least partially owing to the elasticity of the at least one part. During this process, the potential energy stored in the at least one part is released, thereby moving the first conductive component away from the second conductive component and breaking the electrical bridge.

By way of example, a part of the spacer or of the non-conductive layer may incorporate a structure of the spring type or could be made of elastic materials such as a natural rubber, a silicone rubber, a silicone, polyvinyl chloride (hereinafter "PVC"), polystyrene, polyethylene, neoprene, a dielectric gel, or a dielectric rubber.

In yet another particular example which is compatible with any other example in the present document, the cavity is made leaktight and is filled with gas. The gas is configured to contribute to moving the first conductive component away from the second conductive component when the external force stops, thereby creating a spring effect.

The gas may be non-corrosive, non-adhesive and exhibit dielectric or electrical insulation properties. By way of example, the gas may be pure air, or inert gases such as nitrogen, helium and sulfur hexafluoride.

In yet another particular example which is compatible with any other example in the present document, the thickness of the activation device is greater than or substantially equal to the thickness of the antenna when the cavity occupies its normal state. This could ensure a sufficient distance between the first and the second conductive component without otherwise increasing the size of the card.

More particularly, if the antenna has a variable thickness over different segments, the thickness of the activation device may be equal to the maximum thickness of the antenna.

Moreover, the antenna may be an inductive antenna. The thickness of the activation device may be substantially equal to the thickness of the coil of the antenna when the deformable cavity occupies its normal state.

In yet another particular example which is compatible with any other example in the present document, the non-conductive layer is made of polyvinyl chloride (hereinafter "PVC") and/or G10 and/or FR4 and/or polyamide and/or polyimide.

In yet another particular example which is compatible with any other example in the present document, the spacer is made of one or more materials, notably an elastomer, a dielectric rubber or a dielectric gel. More specifically, a dielectric gel or a dielectric rubber could be used as a gel component in the spacer, and be enclosed in a protective shell made of elastomer material or plastics material, such as a polyimide plastic or urethane plastic.

By way of example, the spacer could be made of a silicone rubber or a urethane rubber in the form of gel or in solid form. The elastomer may be soft and thin. It may have a Shore 00 hardness of between 00 and 35.

In yet another particular example which is compatible with any other example in the present document, the card moreover has a metal layer containing the activation device. This could make the process for manufacturing the metal card easier.

More specifically, the card may have a metal card body defining a cavity. The cavity is equipped with a continuous surface defined by an inner surface of the metal card body. The antenna is housed inside the cavity. The activation device is configured to be positioned within a zone at least partially surrounded by a coil of the antenna.

In yet another particular example which is compatible with any other example in the present document, the activation device may be continuous in the antenna. More specifically, one and the other may be preassembled to form a single module in order to make the process for manufacturing the card easier.

In yet another particular example which is compatible with any other example in the present document, the spacer is dielectric or electrically insulating in order to improve the stability and reliability of the activation device.

In yet another particular example which is compatible with any other example in the present document, the spacer covers at least part of one or more surfaces of the first conductive component. This could protect the first conductive component from the environment.

Moreover, the spacer may closely follow one or more surfaces of the first conductive component.

In yet another particular example which is compatible with any other example in the present document, the spacer may of course act as an adhesive owing to its surface tension.

In yet another particular example which is compatible with any other example in the present document, at least one part of the spacer is sandwiched between the non-conductive layer and the second conductive component. The thickness of this at least one part of the spacer thus produces the cavity, which could be a gas pocket.

In yet another particular example which is compatible with any other example in the present document, the activation device has the following structure.

The spacer has an internal through-hole, the lateral walls of which form the lateral walls of the cavity. The second conductive component and the non-conductive layer bearing the first conductive component are at/in the vicinity of opposite ends of the through-hole. The second conductive component at least partially forms one of the bottom and the top surface of the cavity, and the non-conductive layer at least partially forms the other of the bottom and the top surface of the cavity. Moreover, the spacer adheres to the second conductive component and to the non-conductive layer or to a (several) lateral surface(s) of the first conductive component, this making the cavity leaktight, thereby preventing the first conductive component and the inner surface of the second conductive component from being exposed to the adhesives present in the card and used when the card is being manufactured.

In yet another particular example which is compatible with any other example in the present document, the first conductive component has two conductive tracks, one electrically connected to the microprocessor and the other to the antenna. The two conductive tracks are electrically insulated from one another when the cavity occupies its normal state. When the cavity occupies its deformed state and the first and the second conductive component are in contact, the second conductive component is configured to form an electrical bridge for connecting the two conductive tracks of the first conductive component.

By way of example, each of the two tracks has a main base and protuberances extending from the main base. The protuberances of one of the two tracks are interposed between the protuberances of the other of the two tracks. This particular structure could disperse the mechanical stress on the first conductive component, thereby minimizing the risk of fracture. The protuberances may be elongate and may be fixed to the non-conductive layer. In addition, the tracks may be printed on the non-conductive layer by means of printed circuit board (hereinafter "PCB") technology, this making the electrical connection more reliable and the activation device more compact. Moreover, the PCB and the antenna could form a preassembled module, thereby streamlining the manufacturing process. By way of example, in order to ensure a reliable electrical connection, the distance separating neighbouring protuberances may be fixed at twice the thickness of the track. The thickness of the track is determined on the basis of the electrical power specifications required.

In yet another particular example which is compatible with any other example in the present document, the card comprises an incrustation. The activation device is configured to be received or formed in a cavity within the incrustation. As is known in the art, the incrustation has individual layers containing the incorporated electronics, which includes the antenna and may moreover include the microprocessor. These layers are fused together under pressure and heat during a lamination process, thereby forming a sheet or a durable single support. The metal layer may be present in the incrustation.

According to a second aspect, the present invention presents a method for manufacturing the card according to the first aspect. The method comprises a process for manufacturing the activation device. This process comprises a step of forming the cavity, which includes the application of one or more materials of which the spacer is made to the perimeter of the second conductive component.

In a particular example which is compatible with any other example in the present document, the step of forming the cavity moreover comprises a step of applying the one or more materials to one or more lateral surfaces of the first conductive component or to the perimeter of the non-conductive layer.

The spacer may have various layers made of various materials which are superposed in the direction from the first conductive component to the second conductive component so as to increase the distance between the two conductive components when the cavity occupies its normal state. By way of example, the spacer may be made of a layer of dielectric gel and a polyimide layer, these layers being superposed in the vertical direction.

In another particular example which is compatible with any other example in the present document, the method moreover comprises a step of applying layers of adhesive, resin or plastics film to the top and bottom surfaces of the activation device.

In yet another particular example which is compatible with any other example in the present document, the method moreover comprises a step of inserting the activation device into a cavity defined by a metal layer. The cavity extends through the top and bottom surfaces of the metal layer, thereby forming a through-hole. The step of applying the layers of adhesive, of resin or of plastics film to the top and bottom surfaces of the activation device comprises: applying these layers to the respective top and bottom surfaces of the layer.

In yet another particular example which is compatible with any other example in the present document, the method moreover comprises a preassembling step of installing a coil of the antenna around the activation device. The first conductive component is connected to the coil of the antenna.

In that sense, the preassembly of the various elements of the activation device and of the antenna before they are inserted in the card would not modify the established card manufacturing processes.

BRIEF DESCRIPTION OF THE DRAWINGS

Embodiments of the invention and advantages thereof will be described below in detail, by way of example, with reference to the appended schematic drawings as follows.

FIG. 1 illustrates an antenna for a contactless card of the prior art.

FIG. 2 is an exploded schematic perspective view of a card equipped with a contactless interface in accordance with various embodiments disclosed in the present document.

FIG. 3 is a schematic diagram of the circuit of the card in accordance with various embodiments.

FIG. 4 is an example of a top view of a first conductive component of an activation device in the card in accordance with various embodiments.

FIG. 5a is a schematic view, in section, of the activation device when a cavity of the activation device occupies its normal state in accordance with various embodiments.

FIG. 5b is a schematic view, in section, of the activation device when the cavity occupies its deformed state in accordance with various embodiments.

FIG. 5c is an example of a bottom view of the activation device in accordance with various embodiments.

FIG. 6 is a flowchart of a method for manufacturing the card in accordance with a second embodiment disclosed in the present document.

DESCRIPTION OF PARTICULAR EMBODIMENTS

Various aspects of the invention will be illustrated hereinafter by means of the description of particular embodiments.

FIG. 2 illustrates an example of a card equipped with a contactless interface according to a first embodiment of the invention. The card may be a dual-interface credit card.

The card has an incrustation, which comprises a metal card body 4 that defines a cavity and an inductive antenna 7 housed inside the cavity. The card moreover comprises a chip module (not shown). The cavity is provided with a continuous surface defined by an inner surface of the metal card body 4 and extends through the top surface and the bottom surface of the metal card body 4.

The metal card body 4 may be made of stainless steel, or any other type of metal. The cavity may be chemically etched into the metal card body 4. The card moreover comprises a top covering layer 1, a top decorative layer 2, a top polymer layer (not shown), and a top adhesive layer 3 forming a series of superposed layers on the incrustation. In addition, the card comprises a bottom adhesive layer 10, a bottom polymer layer (not shown), a bottom decorative layer 11, and a bottom covering layer 12 forming a series of superposed layers beneath the incrustation.

The top and bottom decorative layers 2 and 11 may have drawings such as a logo or identification information relating to the issuer of the card or the holder of the card. The top and bottom covering layers 1 and 12 are protective layers, and the bottom covering layer 12 may comprise a magnetic strip for sliding the card through a reader device such as a payment terminal. Moreover, the covering layers 1 and 12 and the decorative layers 2 and 11 may be layers made of plastics material, notably but not exclusively made of PVC or polyvinyl chloride acetate ("PVCA"). The top and bottom polymer layers may be made of PVC or an epoxy-based compound. The top and bottom adhesive layers 3 and 10 may be made of resin or other adhesives. The resin may be a curable resin, notably but not exclusively resins containing ester groups, acetal resins, casting resins, impregnated resins, unsaturated resins, saturated resins, urethane acrylate, silicone acrylate, epoxy acrylate, methacrylate, acrylate, or urethane. The polymer layers and the adhesive layers may be completely or partially transparent.

The card moreover comprises an activation device housed inside the cavity and surrounded by the coil of the antenna 7. The activation device comprises, from top to bottom, a deformable non-conductive disc 5, a matrix of conductive tracks 6 (i.e. the first conductive component) adhering to the non-conductive disc 5, a deformable spacer 8 adhering to the non-conductive disc 5 and to a conductive disc 9 opposite to the non-conductive disc 5, between which it is sandwiched, and the conductive disc 9 (i.e. the second conductive component). The deformable spacer 8, which is provided with an annular shape, conjointly with the non-conductive disc 5 and the conductive disc 9, together create a leaktight cavity containing a fluid, preferably air.

The spacer 8 and the non-conductive disc 5 occupy their normal state when no external force is applied to exert a pressure on the non-conductive disc 5, and start to deform when an external force starts to exert a pressure on the non-conductive disc 5. The matrix of conductive tracks 6 and the conductive disc 9 are separated when the spacer 8 and the non-conductive disc 5 occupy their normal state. The conductive disc 9 may be in contact with the antenna 7 and attached thereto. The thickness of the activation device is equal to the thickness of the antenna 7 in the normal state of the spacer 8 and of the non-conductive disc 5. The non-conductive disc 5 is made of polyimide, the conductive disc 9 and the antenna 7 are made of the same material, and the matrix of conductive tracks 6 is made of copper.

A particular region in each of the top covering layers 1, top decorative layer 2 and top polymer layer which corresponds to the position of the activation device in the incrustation is made of one or more deformable materials. This region may be indicated by text, graphic elements, or a distinctive three-dimensional shape in the top covering layer 1 and/or the top decorative layer 2. By way of example, the top covering layer 1 may have a protruding region, corresponding to the location of the activation device. This protruding region may be depressed by the user to cause the compression of the spacer 8 of the activation device and the depression of the non-conductive disc 5.

The chip module may be of any type. The chip module usually comprises a chip, a substrate and external contact pads superposed sequentially from bottom to top. The chip comprises a microprocessor and a memory storage unit, and is configured for the storage and retrieval, the encryption, and the authentication of data, and also other functions necessary for the transfer and authentication of data. The external contact pads are exposed to the external environment to allow the card to interface with card readers.

As can be gathered, although the circuit connection between the microprocessor and the antenna 7 is broken when no pressure is exerted on the activation device, one end of the microprocessor and one end of the antenna 7 remain permanently physically connected, thereby enabling rapid reestablishment of the connection as soon as a pressure is exerted on the activation device. The connection between one end of the microprocessor and one end of the antenna 7 may be in accordance with any established practice. By way of example, one end of the microprocessor, present in the chip, is connected to one end of the antenna 7 of the card via a connection point (also referred to as pad) on the substrate.

In addition, the microprocessor in the chip and the matrix of conductive tracks 6a are electrically connected, for example either by a wire or by a track passing through a via formed through the non-conductive disc 5, and another connection point on the substrate. The antenna 7 and the matrix of conductive tracks 6b can also be electrically connected in a similar way. For the sake of streamlining the manufacturing process, the substrate may make up the non-conductive hub of the antenna.

FIG. 3 is a schematic diagram of the circuit of the card described above according to the first embodiment, the connection points on the substrate being illustrated in the form of contact pads 100 and 200.

The card can function both in contact mode and in contactless mode. In the contact mode, the card communicates with a reader via the exposed contact pads of the chip module. Once they are inserted in a card reader, these contact pads physically touch corresponding contacts in the reader. The reader then supplies a voltage to one of these contact pads, thereby powering the chip.

In the contactless mode, by contrast, the card communicates with a contactless reader by means of RF waves. When the card is brought into the vicinity of the reader, the RF field emanating from the reader induces a voltage in the antenna 7. As illustrated in FIG. 3, turning on the activation device 300 will cause a current to pass from the antenna 7 to the microprocessor PR, thereby activating the contactless function. The contactless function will otherwise be deactivated.

An example of the matrix of conductive tracks 6 is shown in FIG. 4. In this example, the matrix of conductive tracks 6 comprises two distinct and separate conductive tracks 6a and 6b. Each of the two tracks 6a and 6b has a main base and elongate protuberances extending from the main base. The protuberances of one of the two tracks are interposed between the protuberances of the other of the two tracks. As FIG. 4 shows, the protuberances of the two tracks 6a and 6b line up without coming into physical contact. The main base of the track 6a is configured to be connected to the microprocessor and the main base of the track 6b is configured to be connected (not shown) to the antenna 7.

FIGS. 5a and 5b are schematic views, in section, of the activation device 300 when the spacer 8 occupies the normal state and the deformed state, respectively. FIG. 5c is an example of a bottom view of the activation device.

In the first embodiment, the spacer 8 separates the non-conductive disc 5 from the conductive disc 9. More specifically, as illustrated in FIGS. 2 and 5a to 5c, the spacer 8 has a through-hole, the lateral walls of which form the lateral walls of a cavity, and the non-conductive disc 5 and the conductive disc 9 are positioned at the opposite ends of the through-hole to form the top and bottom surfaces, respectively, of the cavity. The cavity is made leaktight by the non-conductive disc 5, the spacer 8 and the conductive disc 9. As illustrated in FIGS. 5a and 5b, air is trapped within the cavity (air pocket 400).

The matrix of conductive tracks 6 is incorporated in the cavity, its upper surface being fixed to and covered by the bottom surface of the non-conductive disc 5. More particularly, the matrix of conductive tracks 6 is printed on the non-conductive disc 5 by means of PCB technology.

The spacer 8 and the non-conductive disc 5 are made of one or more non-adhesive and deformable materials which are dielectric or electrically insulating. The one or more materials are impervious to the adhesive layers. The one or more materials may be elastic (for example a dielectric silicone rubber for the spacer) or have low elasticity (for example a dielectric gel for the spacer). FIG. 5c illustrates the bottom view of the activation device according to an example. The spacer 8 has a layer of dielectric gel. The annular shape of the spacer 8 is clearly visible in FIG. 5c. A pressure is exerted on the activation device in FIG. 5c, which shows part of the button from below, on the opposite side to that on which the pressure is exerted.

Examples of materials of which the non-conductive layer 5 is made include FR4, G10, polyimide and polyamide.

When a user depresses the deformable region on the top covering layer 1 that corresponds to the location of the activation device, the force is transferred to the activation device, to thus make the matrix of conductive tracks 6 enter the cavity. In the example illustrated in FIG. 5b, the force finishes by bringing one of the elongate protuberances of the track 6a and one of the elongate protuberances of the track 6b into electrical contact with the conductive disc 9, thereby forming an electrical bridge between the two tracks 6a and 6b. The microprocessor and the antenna 7 are therefore electrically connected. As illustrated in FIG. 5b, the force also causes the deformation of the spacer 8 and of the non-conductive disc 5 and the redistribution or compression of the air within the cavity.

As soon as the user stops exerting a pressure, the air returns to its initial position within the cavity, and so the spacer 8 and the non-conductive disc 5 undergo a reverse deformation and the matrix of conductive tracks 6 moves away from the conductive disc 9.

If the spacer and/or the non-conductive disc 5 are/is elastic, this elasticity will also make them/it return to their/its initial form and will make the matrix of conductive tracks 6 move away from the conductive disc 9.

The matrix of conductive tracks 6 may be made of copper, gold or tin, and have a minimum thickness of 10 μm so as to avoid the weakening of the radiofrequency communication function of the card.

Examples of thicknesses of other layers of the card are as follows.

The top covering layer 1 is approximately 45 to 60 μm, the top decorative layer 2 is approximately 127 to 145 μm, the top adhesive layer 3 and the top polymer layer combined are approximately 30 to 40 μm, the metal layer 4 is approximately 330 μm, the non-conductive disc 5 is approximately 75 μm, the antenna 7 is approximately 300 μm, the conductive disc 9 is approximately 100 to 120 μm, the bottom adhesive layer 10 and the bottom polymer layer combined are approximately 40 to 50 μm, the bottom decorative layer 11 is approximately 127 to 145 μm, and the bottom covering layer 12 is approximately 45 to 60 μm.

Although they are shown in the form of round discs 5 and 9 in FIG. 2, the first and second conductive components may take other forms. For the sake of reliability and simplicity, they may be provided with the same form and the same size. In this particular example, the activation device acts like a button. When the user depresses the button, the contactless function of the card is activated. When they release the button, the contactless function is deactivated.

FIG. 6 illustrates the flow of an example of a method for manufacturing the card according to a second embodiment of the invention.

In step S601, a dielectric gel is applied to the perimeter of the non-conductive disc 5 and the perimeter of the conductive disc 9 to create a leaktight cavity between the two discs 5 and 9. The non-conductive disc 5 has been prefabricated, the matrix of conductive tracks 6 having already been fixed thereto at the end of the prefabrication process. One of the tracks 6a and 6b is already connected to the antenna 7 and the other of the tracks is already connected to the microprocessor. Similarly, the conductive disc 9 has been prefabricated.

More particularly, the dielectric gel adheres to lateral surfaces of the tracks 6a, 6b and forms a sandwich structure in which the spacer 8 is sandwiched between the non-conductive disc 5 and the conductive disc 9. The thickness of the dielectric gel produces an air pocket which separates the tracks 6a, 6b from the conductive disc 9 when no pressure is exerted on the activation device.

In step S602, an adhesive is applied to the bottom polymer layer, which is placed on the table of an adhesive-applying machine.

In step S603, the metal card body 4 is placed on the bottom adhesive layer 10 formed at the end of step S602, and the activation device and the antenna 7 are inserted into the metal card body, with the coil of the antenna 7 surrounding the activation device.

In step S604, an adhesive is applied to the top surfaces of the metal card body 4 and the components inserted therein.

In step S605, the top polymer layer is placed on the top adhesive layer 3 formed at the end of step S604.

Steps S602 to S605 form part of the prelamination phase. A secondary prelamination phase could follow it. In step S606, the top decorative and covering layers 2 and 1 are placed on top of the top polymer layer, and the bottom covering and decorative layers 11 and 12 are placed beneath the bottom polymer layer.

In step S607, a varnish is added to the top and bottom surfaces of the layers.

In step S608, a chip module is incorporated in the card.

In step S609, the card is customized and subjected to quality control tests so as to ensure it works correctly and is secure.

For more details about the manufacturing process, see U.S. patent application Ser. No. 18/084,039, which is incorporated by reference in the present document.

The invention claimed is:

1. A card equipped with a contactless interface, the card comprising an activation device, a microprocessor and an antenna, the activation device comprising:

a first conductive component;

a second conductive component; and a spacer in contact with a perimeter of the second conductive component, the spacer being configured to form lateral walls of a deformable cavity within the activation device, and the second conductive component being configured to form at least part of either a top or a bottom surface of the cavity;

the cavity having a normal state and a deformed state, and at least part of the cavity being configured to separate the first conductive component from the second conductive component when the cavity is in the normal state;

one of the microprocessor and the antenna being connected to the first conductive component when the cavity is in the normal state;

when a force external to the activation device is applied to the activation device to move the first conductive component towards the second conductive component, the cavity being configured to transition from the normal state to the deformed state by deformation of the spacer, and at least one part of the first conductive component being configured to enter the cavity, thus forming an electrical contact with the second conductive component when the cavity is in the deformed state to establish an electrical connection between the microprocessor and the antenna; and when the external force stops being applied, the cavity is configured to return to its normal state, thus moving the first conductive component away from the second conductive component to break the electrical connection.

2. The card according to claim 1, wherein the activation device further comprises:

a non-conductive layer retaining the first conductive component.

3. The card according to claim 2, the non-conductive layer and the second conductive component being respectively arranged on opposite surfaces of the cavity; or the non-conductive layer being made of FR4 and/or G10 and/or polyimide and/or polyamide.

4. The card according to claim 1, further comprising an adhesive, the first conductive component being encapsulated within the cavity, the cavity being made leaktight, and the spacer being made of one or more materials impervious to the adhesive.

5. The card according to claim 1, wherein at least one element of the activation device is deformable and has a normal state and a deformed state, the at least one element comprising the spacer or a non-conductive layer configured to bear the first conductive component, and the cavity being configured to occupy its normal state when the at least one element occupies its normal state, and being configured to occupy its deformed state when the at least one element occupies its deformed state.

6. The card according to claim 5, wherein at least one part of the at least one element is elastic, and is configured to deform when the external force is applied to the activation device, and to contribute to moving the first conductive component away from the second conductive component when the external force stops; or wherein the cavity is leaktight and filled with gas, and the gas is configured to contribute to moving the first conductive component away from the second conductive component when the external force stops.

7. The card according to claim 1, wherein a thickness of the activation device is greater than or equal to a thickness of the antenna when the cavity occupies its normal state, or the spacer is made of one or more materials comprising an elastomer or a dielectric gel.

8. The card according to claim 1, wherein the card comprises a metal layer containing the activation device, or the activation device is present in the antenna.

9. The card according to claim 1, wherein the spacer is dielectric or electrically insulating, or at least one part of the spacer is sandwiched between the second conductive component and a non-conductive layer bearing the first conductive component; or the spacer covers at least part of one or more surfaces of the first conductive component.

10. The card according to claim 1, wherein the first conductive component comprises two conductive tracks, one electrically connected to the microprocessor and the other to the antenna, and the two conductive tracks are electrically insulated from one another when the cavity occupies its normal state.

11. The card according to claim 1 wherein the card is a card compatible with radiofrequency identification "RFID".

12. A method for manufacturing the card according to claim 1, comprising a process for manufacturing the activation device, the process comprising:

forming the cavity by application of one or more materials of which the spacer is made to the perimeter of the second conductive component.

13. The method according to claim 12, wherein forming the cavity further comprises:

applying the one or more materials to one or more lateral surfaces of the first conductive component or to a perimeter of a non-conductive layer bearing the first conductive component.

14. The method according to claim 12, moreover comprising:

applying layers of adhesive, of resin or of plastics film to a top surface and a bottom surface of the activation device.

15. The method according to claim 14, moreover comprising:

inserting the activation device into a cavity defined by a metal layer, the cavity extending through a top surface and a bottom surface of the metal layer, and the applying of layers of adhesive, of resin or of plastics film to the top surface and the bottom surface of the activation device comprising:

applying layers of adhesive, of resin or of plastics film to the respective top and bottom surfaces of the metal layer.

16. The card according to claim 1, wherein the first conductive component is configured to deform into an arcuate shape in the when the cavity is in the deformed state.

17. The card according to claim 1, wherein the second conductive component comprises a single planar conductive element.

18. The card according to claim 1, wherein the first conductive component comprises two members each having a plurality of conductive tracks, the two members are electrically separated from each other, the conductive tracks of the two members are interleaved, and the electrical connection is established by making electrical contact between the two members using the second conductive component.

19. The card according to claim 18, wherein the two members are respectively electrically connected to the antenna and the microprocessor.

* * * * *